United States Patent [19]

Norback

[11] 4,118,198

[45] Oct. 3, 1978

[54] CATALYTIC PURIFIER UNIT

[75] Inventor: Per G. Norbäck, Lidingö, Sweden

[73] Assignee: Aktiebolaget Carl Munters, Sollentuna, Sweden

[21] Appl. No.: 651,059

[22] Filed: Jan. 21, 1976

Related U.S. Application Data

[62] Division of Ser. No. 481,211, Jun. 20, 1974, Pat. No. 3,951,865.

[30] Foreign Application Priority Data

Jun. 25, 1973 [SE] Sweden .................................. 7308909

[51] Int. Cl.² .............................................. F01N 3/15
[52] U.S. Cl. ...................................... 422/173; 60/298; 165/7; 422/180
[58] Field of Search ......................... 23/288 F, 288 FC; 165/7; 60/298

[56] References Cited

U.S. PATENT DOCUMENTS

| | | | |
|---|---|---|---|
| 3,525,384 | 8/1970 | Horton | 165/7 |
| 3,817,714 | 6/1974 | Wiley | 60/298 |
| 3,910,042 | 10/1975 | Yuge et al. | 23/288 F X |
| 3,943,994 | 3/1976 | Cleveland | 23/288 F X |
| 3,957,445 | 5/1976 | Foster | 23/288 FC X |
| 3,967,929 | 7/1976 | Tamazawa et al. | 23/288 F |
| 3,978,914 | 9/1976 | Phillips | 165/7 |

*Primary Examiner*—Morris O. Wolk
*Assistant Examiner*—Roger F. Phillips
*Attorney, Agent, or Firm*—Eric Y. Munson

[57] ABSTRACT

Purifier unit comprising a porous body coated with a substance having catalytic action to bring about purification of a medium, primarily a gas passing through the unit. A main field of use is the purification of hot exhaust gases from internal combustion engines. To render the porous purifier unit insensitive to the high temperature of the engine exhaust gases and the great variations of temperature particularly in winter time when starting a motor vehicle, and at the same time resistant to high mechanical stress and shock arising mainly from jolts and vibrations of a motor vehicle in motion, the porous body is comprised of a plurality of thin, at least partly corrugated, layers forming between themselves fine passageways extending from end to end for the medium to be purified and coated with the catalyst. The layers consist of a skeleton obtained from asbestos paper by precipitation of certain inorganic substances and subsequent heating to the fusing or slagging temperature for said substances.

7 Claims, 3 Drawing Figures

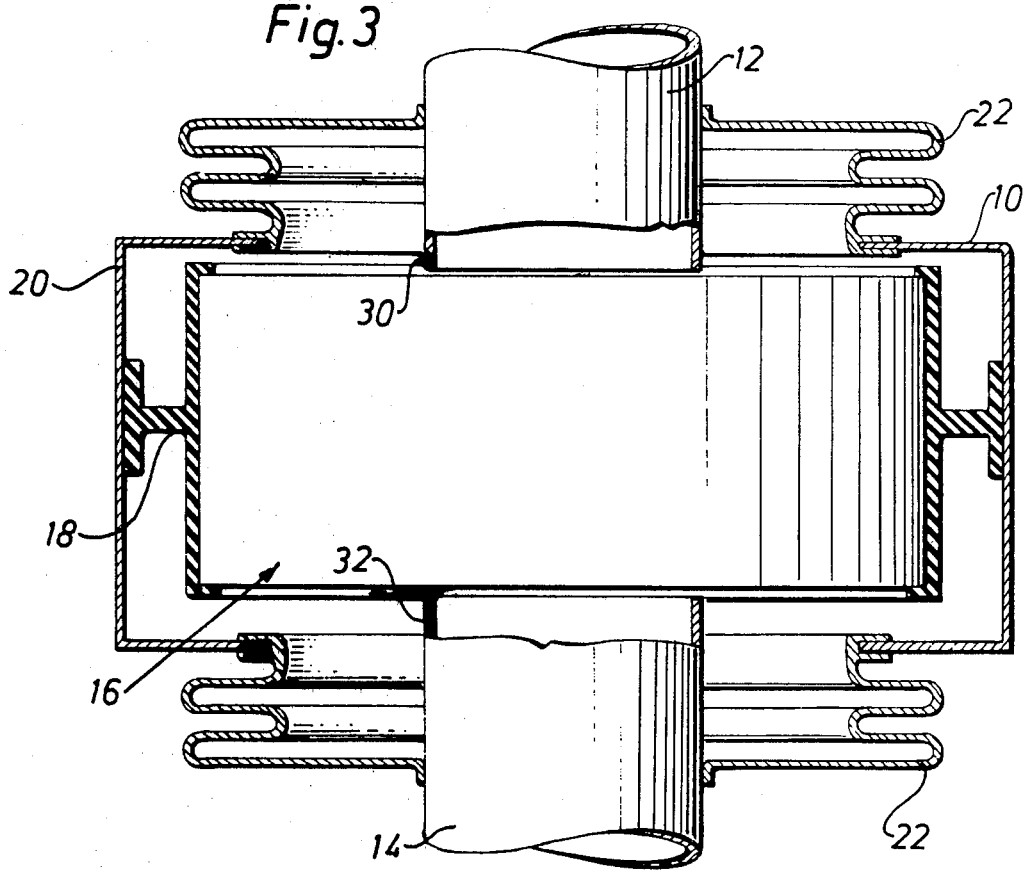
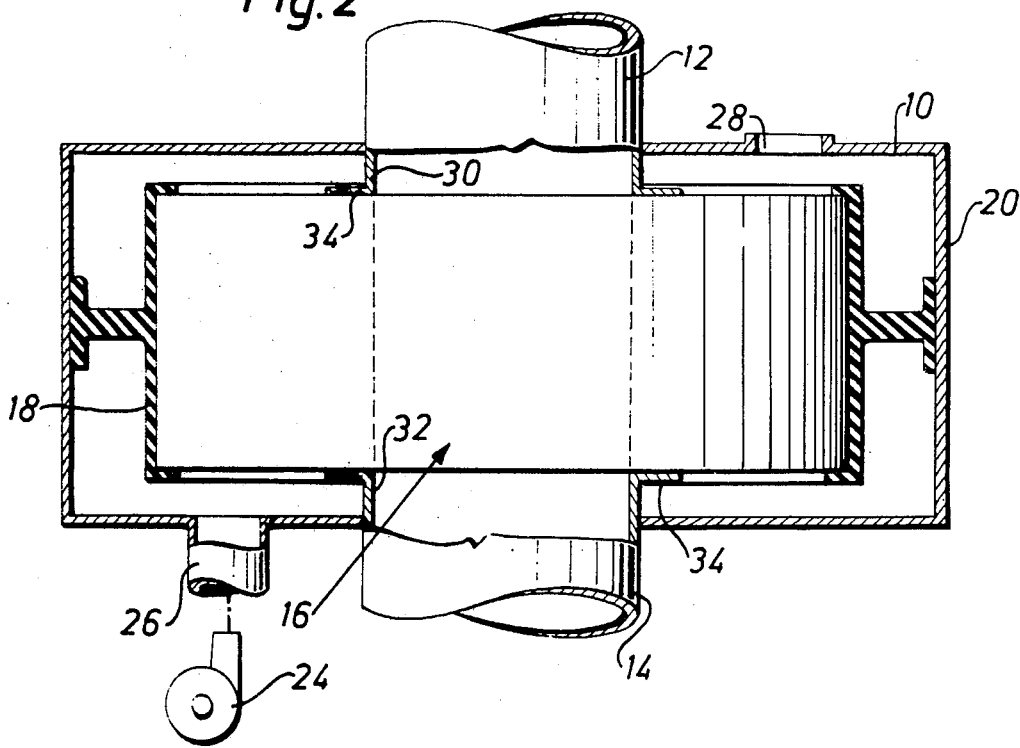

CATALYTIC PURIFIER UNIT

This is a division, of application Ser. No. 481,211 filed June 20, 1974 and now U.S. Pat. No. 3,951,865.

FIELD OF THE INVENTION

This invention relates to a catalytic purifier unit.

More particularly this invention relates to a catalytic purifier unit comprising a porous body and a catalyst such as platinum provided thereon. One main field of use for such a catalytic purifier unit is transformation by oxidation of noxious and toxic substances, such as carbon monoxide contained in exhaust gases, into an innocuous state.

MAIN OBJECTS OF THE INVENTION

A main object of the invention is provision of a catalytic purifier unit which can be exposed to high temperatures and which is insensitive to great and rapid variations of temperature.

A specific object of the invention is the provision of a catalytic purifier unit which combines the aforesaid properties with resistance to such mechanical stresses and shocks which appear in connection with the utilization of the unit as an exhaust gas purifier in motor vehicles.

A substantial factor is that the porous body must have a large surface area over which the catalyst is distributed and which is exposed to hot gases passing through the body, such as the exhaust gases from an internal combustion engine.

Thus, a further object of the invention is the provision of a catalytic gas purifier unit having a strong porous body exposing a large surface area to the gases to be purified while at the same time possessing high resistance against said gases.

MAIN FEATURES OF THE INVENTION

The applicant has recognized that a body which effectively meets the afore stated requirements is desirably composed of thin layers which at least partly are corrugated and bear against one another for forming a great number of narrow passageways extending from end to end for the gases passing through the purifier unit. These layers consist of a coherent porous skeleton of inorganic material formed on a carrier of thin asbestos sheet material. This skeleton is obtained by applying onto the asbestos sheet material one or more liquids in which are dissolved inorganic substances which upon precipitation on the fibers of the asbestos sheet material are heated to high temperature.

As the heating is forced up to 900° to 1200° C., water of crystallization present in the asbestos fibers is expelled. Due to the loss of water of crystallization the asbestos looses practically all mechanical strength but combines with the inorganic material which fuses or slags together to the thin skeleton which, in spite of its high porosity, imparts high mechanical strength to the finished body.

The asbestos may have a thickness corresponding to a surface weight of 80 to 100, up to 150 to 250, gs/m² or even more. Due to the heating both the water of crystallization and organic components of the asbestos binding together the fibers, and in total amounting to 15 – 30 percent by weight, are expelled. The inorganic substance or substances supplied thereafter, which in final state may be of ceramic or mineralic character, are supplied in so limited quantities that the surface weight in grams per square meter of the layers in the final state may be approximately the same as that of the asbestos at the outset. However, some increase of the weight per surface unit may be tolerated, such as in the range from 20 to 50 percent.

MAIN ADVANTAGES OF THE INVENTION

The whole treatment causes the layers spirally wound up to form the porous body to become highly insensitive, due to their thinness to the great differences in temperature to which the body is exposed. For example, on starting the motor in winter time it is heated rapidly from below zero to many degrees above zero. Due to the minimum thickness, the cross-section of the layers will almost instantaneously be heated homogeneously by the increase of the temperature of the gas so that no heat tensions i.e. thermal stress will be produced as is the case when the porous body is built up of ceramic material having thicker layer walls obtained by applying, on a carrier, a dispersion of a pulverulent substance which, after evaporation of the liquid, is fused together into a coherent layer. In such, high differences in temperature encountered in winter time when a car engine is heated from many degrees below zero to the high temperature of the exhaust gases, the external portions of the layers are expanded more rapidly than their interior portions so that the material is flaked apart.

According to the invention, the layers of the porous body after that they have been coated with the catalyst, as by precipitation of platinum from a solution, present a very large outwardly exposed surface area calculated per surface unit of the layers, which surface is effective for the intended purification of the exhaust gases, e.g. by combustion, to carbon dioxide, of the carbon monoxide contained in said gases.

Layers contained in the porous body will, as a consequence of their minimum thickness, be insensitive to variations in temperature, as already stated hereinbefore. In addition, due to the low weight of the layers the forces of inertia produced by jolts or shakes of the vehicles and vibrations acting on the body become insignificant. Thus, the individual layers are not smashed or broken. However, this property may cause problems in the fitting in of the body, and for this reason an elastic suspension may be arranged, if desired, in combination with a reinforcement of the layers in the zone of attachment.

THE DRAWINGS

Further advantages, objects and properties of the invention will become apparent from the following description, considered in connection with the accompanying drawings, which form part of this specification and of which:

FIG. 2 is a sectional view of the exhaust gas purifier unit shown in FIG. 1;

FIG. 3 is a sectional view of an exhaust gas purifier unit according to a modified embodiment.

DETAILED DESCRIPTION OF TWO PREFERRED EMBODIMENTS

Figure 1:
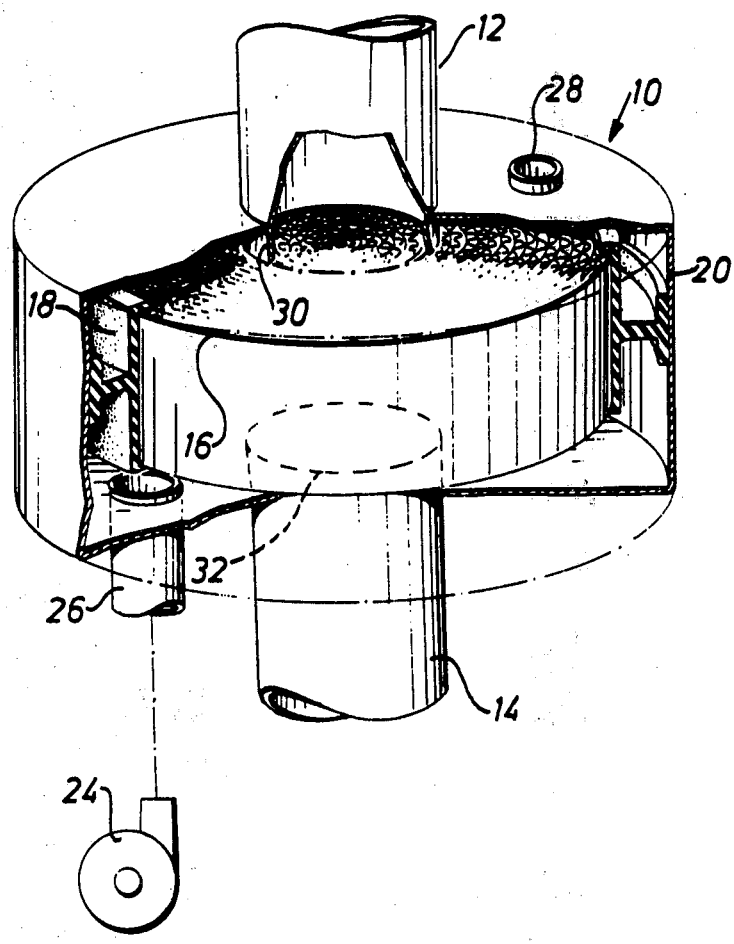
FIG. 1 is a perspective view of an exhaust gas purifier unit constructed according to the invention and with parts assumed cut away for obtaining proved clarity.

Referring now to the drawings, the exhaust gas purifier unit generally denoted 10 is mounted in an exhaust gas pipe 12, 14 from an engine. The exhaust gas purifier comprises a porous body 16 which may have the shape of a cylindrical disc and at its outer circumference is secured to a cylindrical casing 20 by means of an annular support 18. In the embodiment illustrated in FIGS. 1 and 2, this casing is directly connected with the pipe portions 12, 14 and in the embodiment illustrated in FIG. 3 through bellow members 22.

The body 16 is built up of spirally wound layers which are alternately plane and corrugated. The corrugations extend axially between the two plane front sides of the body. The space between the plane layers is preferably 3 mms at the utmost, which corresponds to a medium spacing between the layers of 1.5 mms. In practical embodiments, the spacing between the plane winding turns usually is about 1.5 mms. In the manufacture of the body one starts from strip units of single faced corrugated asbestos, e.g. one plane and one corrugated layer interconnected by means of water glass, for example. The body obtained after the winding is dipped into, or coated with, one or several solutions, suitably aqueous ones, of inorganic salts of such a kind that they upon evaporation of the solvent and subsequent heating to high temperature together with the remainder of the asbestos from the supporting skeleton on the asbestos sheets.

Applied to the finished body is a solution of the catalyst such as a platinum compound in a manner known per se as extremely thin coating over the highly porous layers contained in the skeleton.

The substance or substances required for the forming of the porous body may be silicates, such as calcium or aluminum silicate, or oxides, such as aluminum oxide.

EXAMPLE 1

A single-faced strip unit composed of one plane and one corrugated sheet of asbestos paper with a surface weight of 80 – 100 gs/m$^2$ is wound spirally to a body of desired dimension. Thereupon the body is dipped into a water glass solution (sodium water glass) having a density of 1.30 kgs/dm$^3$. The body is allowed to rest in the solution for so long a time that all air bubbles have disappeared, whereupon so much water glass is removed that the fine channels become opened.

The body is turned back and fro so that the water glass is distributed evenly within the same. Thereupon the body is deposited in concentrated ethyl alcohol (96 percent) and lifted up and dipped down several times so that all parts of the body are brought into contact with the concentrated alcohol. In this way the water glass is dehydrated and the body thereby becomes relatively rigid and adapted to be handled and can be transferred into a boiling aqueous solution of aluminum chloride (1 part by weight AlCl$_3$ — 6 H$_2$O to 1 part by weight of water). The body is allowed to stay in the boiling aluminum chloride solution for 1 hour, whereupon it is taken up and dried in hot air having a temperature of 300° C. Hereunder the body has obtained a precipitate of aluminum silicate and aluminum oxide. Finally the body is placed into a kiln wherein the temperature is allowed to rise uniformly to 1150° C. under 3 hours and thereupon to cool down uniformly to room temperature, also during three hours. The ceramic body is now ready and can be worked on its flat sides by means of a grinding operation.

EXAMPLE 2

To obtain a body of higher mechanical strength one may employ a relatively thick asbestos paper having a surface weight of 150 – 250 gs/m$^2$ for preparation of the single-faced corrugated strip units and perform the dipping in a water glass solution having a density of 1.375 kgs/dm$^3$. Otherwise, the treatment is the same as according to example 1.

EXAMPLE 3

The boiling after the dipping into alcohol is effected in a saturated solution of calcium chloride, calcium silicate being obtained as precipitate. This operation may be done with both qualities of paper referred to in the preceding two examples. The temperature of calcination is the same as previously. The mechanical strength becomes slightly higher in the method according to examples 1 and 2.

EXAMPLE 4

The boiling after the dipping into alcohol is made as in example 3. Thereupon the body is rinsed in water, dried and dipped into aluminum chloride. During the subsequent heating to the high temperature the aluminum chloride is decomposed so that aluminum oxide is formed which additionally reinforces the body.

As will be seen from the drawing figures, the porous body may have a greater diameter than the diameter of the pipes 12, 14 for which reason the central part of the porous body only need be utilized for the intended catalytic effect. This part may be equally great or even greater than the pipe diameter; in the latter case the volume occupied by the porous layers is compensated for so that the speed of the exhaust gases through the body can be maintained constant. Those portions of the body which thus are not active, need not be provided with catalyst coating, but may instead be made mechanically stronger so that the strength of the body is greater in the outer portions than in the central ones. This reinforcement of an outer zone may be brought about by repeatedly dipping said zone into, or spraying it with, the solution or solutions of the inorganic substances. Due to the fact that the body is suspended or attached at its reinforced portions, the relatively fragile core of the porous body is protected against damaging action resulting from e.g. jolts of the car. The same protective effect may be obtained or improved by making the external annular support 18 of some elastic material such as rubber. Due to the fact that the body has a greater diameter than the active core reduction of temperature is obtained from the core to the zone of suspension, which renders possible use of suspension members which do not tolerate the exhaust gas temperature. Thus a temperature may be created in this zone or chamber which is sufficiently lower than that of the hot gases to be ineffective upon the elastic organic material.

In addition it may be desirable to cool the outer zone of the porous body by means of a gas such as air which by means of a fan 24 and a duct 26 is introduced at one side of the body 10 under increased pressure and departs at the other side thereof through an outlet 28 upon passage through the parallel fine channels of the outer zone which extend axially from one flat front side of the body to the other one. The cooling zone must be screened off from the central zone passed by the exhaust gases, e.g. by the ends 30 and 32 of the pipes 12 and 14, respectively, projecting into the body over the flat front sides thereof. By means of washers 34 according to FIG. 2 a faying surface of great radial extension may be obtained towards the porous body 16.

The bellow-shaped shells 22 according to FIG. 3 have for their purpose firstly to absorb the effect of jolts or shakings and vibrations of the car and secondly to counteract conduction of heat from the hot pipes 12, 14 to the casing 20 of the purifier and/or to the resilient annular support 18 at the outer circumference of the body.

While several specific embodiments of the invention have been shown and described, it is to be understood that this is for purpose of illustration only, and that the invention is not to be limited thereby, but its scope is to be determined by the appended claims.

I claim:

1. A catalytic purifier unit for purifying hot exhaust gases comprising:

a skeletal body formed of layers, at least some of which are corrugated, bearing against one another and defining a large number of open-ended narrow axially aligned passageways through which the exhaust gases flow from one end to the other thereof, a casing for enclosing said body, said body comprising a first centrally located catalytically treated zone and a second insulating zone surrounding said first zone, said casing having inlet means and outlet means in axial alignment and communicating with at least a portion of the passageways of said catalytically treated zone for directing the hot gases through said catalytically treated zone, said second zone having elastic means of organic material resiliently supporting said body.

said insulating zone being effective for maintaining said organic supporting member at a lower temperature than the temperature of the first catalytically treated zone because of the separation of said supporting member from said first zone by said insulating zone therebetween, thereby increasing the useful life and durability of said supporting member.

2. A catalytic purifier as recited in claim 1 further comprising seal means positioned between said inlet means and said skeletal body, and between said outlet means and said skeletal body in axial alignment with said inlet means and said outlet means for forming a channel for the passage of exhaust gases through said inner zone.

3. A catalytic purifier as recited in claim 2, wherein said casing is provided with inlet and outlet apertures positioned in such a manner that a cooling medium entering one of said apertures will pass through said outer insulating zone and exit out of said casing through the other of said apertures, whereby said outer insluating layer is further cooled and whereby said cooling medium is prevented from entering said inner zone because of said seal means.

4. A catalytic purifier as recited in claim 3 further comprising a fan in communication with one of said apertures in said casing for the purpose of supplying a cooling medium to be introduced into said aperture.

5. A catalytic purifier as recited in claim 2 wherein said outer insulating zone is treated with an inorganic material for reinforcing its strength and durability.

6. A catalytic purifier as recited in claim 2, wherein said seal means comprises a plurality of disc members.

7. A catalytic purifier as recited in claim 2, comprising means between said inlet means and said casing, and between said outlet means and said casing for absorbing vibrations and for further inhibiting transmission of heat from said inner to said outer zone.

* * * * *